Nov. 30, 1948.  S. R. DU BRIE  2,455,048
ATTACHMENT FOR TRAILER BOAT CASTER UNITS
Filed June 4, 1947
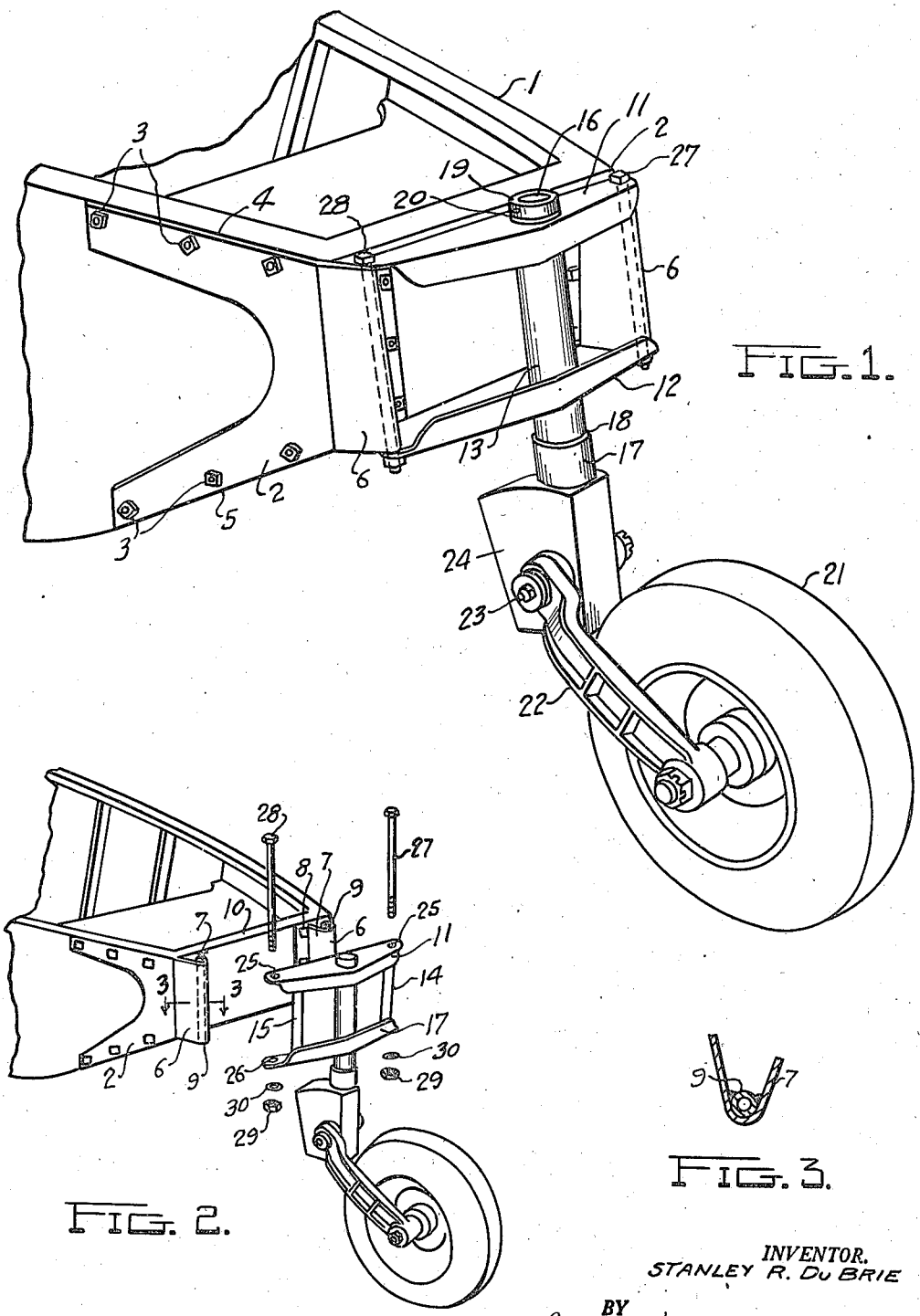
INVENTOR.
STANLEY R. Du BRIE
BY
Barnes, Kisselle, Laughlin & Raisch
ATTORNEYS Patented Nov. 30, 1948

2,455,048

UNITED STATES PATENT OFFICE 2,455,048

ATTACHMENT FOR TRAILER BOAT CASTER UNITS

Stanley R. Du Brie, Detroit, Mich., assignor to Detroit Engineering Laboratories, Inc., Detroit, Mich., a corporation of Michigan Application June 4, 1947, Serial No. 752,347

7 Claims. (Cl. 9—1)

This invention relates to an attachment for a trailer boat caster unit.

It is an object of this invention to produce an attachment for a trailer boat caster unit which is rugged, simple in structure and easily assembled to, and disassembled from, the trailer boat.

Fig. 1 is a perspective showing the caster unit attached to the boat.

Fig. 2 is an exploded view showing the caster unit detached from the boat.

Fig. 3 is a section along line 3—3 of Fig. 2.

Referring more particularly to the drawings, I have shown the stern end of a boat 1 which can be made from any suitable material, such as wood or an alloy of a light metal such as aluminum or magnesium. To each side of the stern end of the boat I attach a U-shaped metal strap 2 by means of bolts 3. It will be noted that the strap extends from the top to the bottom of the stern end of the boat and follows the contour of the same, the upper edge 4 of the strap coinciding with the upper edge of the boat and the lower edge 5 of the strap coinciding with the lower edge of the boat. The rear ends 6 of each of the straps project beyond the stern of the boat and have a return bent portion 7 which is secured by bolts 8 to the stern end of the boat. A steel or other suitable metal tube 9 is welded or otherwise secured within the apex of each of the return bent portions 7. The locating of the iron straps 2 on each side of the boat, as above described, leaves the stern board 10 of the bolt free so that an outboard motor can be attached to the stern end 10 without any interference from the straps 2.

The caster unit comprises an upper plate 11 and a lower plate 12, each made from a suitable metal such as steel and being of angle section. The caster head is in the form of a metal tube 13 which projects through, and is welded to, the two plates 11 and 12 midway between their ends. Plates 11 and 12 are also secured together by vertical straps 14 and 15 which are welded at their top and bottom ends to the two plates 11 and 12.

A swivel pin 16 passes through tube 13 which provides a swivel bearing therefor. The lower end of swivel pin 16 is fixed in collar 17 which bears against the lower end of tube 13 as at 18. The upper end of swivel pin 16 has a ring 19 secured thereto which bears against the upper end 20 of tube 13.

The caster wheel 21 is rotatably mounted on arm 22 which is pivotally supported as at 23 in housing 24 by a knee action which is described and claimed in my copending application Serial No. 698,536, filed September 21, 1946. Housing 24 is integral with collar 17. Plates 11 and 12 are provided with vertically aligned openings 25 and 26 at each end.

To secure the caster unit to the boat it is merely necessary to position plates 11 and 12 above and beneath, respectively, tubes 9 with holes 25 and 26 in alignment with the openings in the tubes and then bolts 27 and 28 are dropped through openings 25 and 26 and tubes 9 and secured therein by screwing nuts 29 on their lower ends. 30 is simply a washer which is positioned over the lower ends of the bolts 27 and 28 between nuts 29 and plate 12.

It is, of course, understood that the bow end of the boat will be attached to the bumper of an automobile by any suitable trailer hitch. It is evident from the above that when one desires to use the boat the caster unit can be readily detached therefrom by simply removing nuts 29 and lifting bolts 27 and 28 out of their respective plates and tubes 9, as illustrated in Fig. 2. Thus, the caster unit can be readily attached to, and detached from, the boat 1 easily and expeditiously.

I claim:

1. Means for attaching a caster unit to an end of a trailer boat comprising a pair of metal straps adapted to be secured to the opposite sides, and adjacent the end, of a boat, said straps each having a portion adapted to project beyond the end of the boat, a pair of vertical sockets supported one on each of the projecting ends of the straps, a rigid framework having a pair of vertically opposed openings at each end, a caster wheel swiveled on said framework centrally thereof, the said framework being positioned over said socket members with the opposed openings aligned with, and positioned at the opposite ends of, the socket members, and means passing through said openings and socket members for detachably securing the framework to the socket members.

2. Means for attaching a caster unit to an end of a trailer boat comprising a pair of metal straps adapted to be secured to the opposite sides, and adjacent the end, of a boat, said straps each having a portion adapted to project beyond the end of the boat, a pair of vertical tubes supported one on each of the projecting ends of the straps, a rigid framework having a pair of vertically opposed openings at each end, a caster wheel swiveled on said framework centrally thereof, the said framework being positioned over said tubes with the opposed openings aligned with, and positioned at the opposite ends of the tubes, and pins passing through said openings and tubes for detachably securing the framework to the tubes.

3. Means for attaching a caster unit to an end of a trailer boat comprising a pair of metal straps adapted to be secured to the opposite sides, and adjacent the end, of a boat, said straps each having a portion adapted to project beyond the end of the boat, a pair of vertical sockets supported one on each of the projecting ends of the straps, a pair of horizontally positioned and vertically spaced plates having vertically aligned openings at each end, a vertical tubular bearing positioned centrally of, and secured to, said plates, a caster wheel, a swivel pin for said caster wheel journalled in said bearing, the said plates being positioned over said socket members with the aligned openings positioned at the opposite ends of the socket members, and means passing through said openings and socket members for detachably securing the plates to the socket members.

4. Means for attaching a caster unit to an end of a trailer boat comprising a pair of metal straps adapted to be secured to the opposite sides, and adjacent the end, of a boat, said straps each having a portion adapted to project beyond the end of the boat, a pair of vertical sockets supported one on each of the projecting ends of the straps, a pair of horizontally positioned and vertically spaced plates having vertically aligned openings at each end, a vertical tubular bearing positioned centrally of, and secured to, said plates, a caster wheel, a swivel pin for said caster wheel journalled in said bearing, the said plates being positioned over said socket members with the aligned openings positioned at the opposite ends of the socket members, and bolts passing through said openings and socket members for detachably securing the plates to the socket members.

5. Means for attaching a caster unit to an end of a trailer boat comprising a pair of metal straps adapted to be secured to the opposite sides, and adjacent the end, of a boat, said straps each having a portion adapted to project beyond the end of the boat, a pair of vertical tubes supported one on each of the projecting ends of the straps, a pair of horizontally positioned and vertically spaced plates having vertically aligned openings at each end, a vertical tubular bearing positioned centrally of, and secured to, said plates, a caster wheel, a swivel pin for said caster wheel journalled in said bearing, the said plates being positioned over said tubes with the aligned openings positioned at the opposite ends of the tubes, and bolts passing through said openings and tubes for detachably securing the plates to the tubes.

6. In combination with a trailer boat, a pair of metal straps secured to the opposite sides and adjacent the end of the said boat, the upper and lower edges of said straps substantially coinciding with the upper and lower edges of the said boat, said straps each having a portion projecting beyond the end of the boat, a pair of vertical sockets supported upon each of the projecting ends of the straps, a rigid framework having a pair of vertically opposed openings at each end, a caster wheel swiveled on said framework centrally thereof, the said framework being positioned over said socket members with the opposed openings aligned with, and positioned at the opposite ends of, the socket members, and means passing through said openings and socket members for detachably securing the framework to the socket members.

7. In combination with a trailer boat, a pair of metal straps secured to the opposite sides and adjacent the end of the said boat, the upper and lower edges of said straps substantially coinciding with the upper and lower edges of the said boat, said straps each having a portion projecting beyond the end of the boat, a pair of vertical tubes supported upon each of the projecting ends of the straps, a rigid framework having a pair of vertically opposed openings at each end, a caster wheel swiveled on said framework centrally thereof, the said framework being positioned over said tubes with the opposed openings aligned with, and positioned at the opposite ends of, the tubes, and pins passing through said openings and tubes for detachably securing the framework to the tubes.

STANLEY R. DU BRIE.

No references cited.